May 16, 1944. J. S. OTT 2,348,920
APPARATUS FOR ASSEMBLING STRUCTURES
Filed June 23, 1941 6 Sheets-Sheet 1

INVENTOR.
JOSEPH S. OTT.
BY
ATTORNEY

May 16, 1944. J. S. OTT 2,348,920
APPARATUS FOR ASSEMBLING STRUCTURES
Filed June 23, 1941 6 Sheets-Sheet 2

INVENTOR.
JOSEPH S. OTT.
BY
ATTORNEY.

May 16, 1944. J. S. OTT 2,348,920
APPARATUS FOR ASSEMBLING STRUCTURES
Filed June 23, 1941 6 Sheets-Sheet 5

INVENTOR.
JOSEPH S. OTT.
BY
ATTORNEY.

May 16, 1944.  J. S. OTT  2,348,920
APPARATUS FOR ASSEMBLING STRUCTURES
Filed June 23, 1941   6 Sheets-Sheet 6

INVENTOR.
JOSEPH S. OTT.
BY
ATTORNEY.

Patented May 16, 1944

2,348,920

UNITED STATES PATENT OFFICE 2,348,920

APPARATUS FOR ASSEMBLING STRUCTURES

Joseph S. Ott, Chicago, Ill., assignor to Joe Ott Manufacturing Co., Chicago, Ill., a corporation of Illinois Application June 23, 1941, Serial No. 399,332

9 Claims. (Cl. 29—84)

This invention relates to a method of and apparatus for assembling structural devices and more particularly toy airplane structures, although it may be used for other purposes.

It contemplates more especially the provision of a unique method of assembling miniature structures such as toy airplane bodies by resort to a templet or pattern which cooperates with the parts to be assembled so that uniformity in arrangement and unskilled application will result in a structure conforming to the design of the manufacturer supplying the parts therefor.

Miniature structures such as toy airplanes and the like have been commercially exploited for many years as a kit containing parts with instructions for assembling. The parts that are supplied together with the instructions entail a great deal of labor, time and skill in order to result in a structure conforming to the design for which the parts are supplied. It is customary to furnish elements of a miniature structure so that each will be segmented by the purchaser from the sheet of material having the segmented parts imprinted thereon. This involves cutting out operations that are tedious, require skill and entails appreciable time which usually discourages all but the very experienced.

Then, too, the degree of success attained in producing a miniature structure is largely dependent upon the skill of the assembler so that the miniature toy building industry while substantial in extent, has not been as widespread as would otherwise be possible with the elimination of appreciable amounts of time, labor, skill in the building and assembling operation and the assurance of uniformity so that the resultant structure will conform to the design for which it was originally intended in shape, exact contour, operating qualities and appearance.

The assembly of bodies has proven difficult and this is especially true in knockdown toy structures which interest youngsters of inexperience, lacking judgment, and limited skill. With the teachings of the present invention, bodies including appendages thereto can be readily shaped, quickly assembled and uniformly produced without entailing any appreciable labor, skill and time. Simple expedients that accomplish these results are especially advantageous in knock-down toy structures owing to the inability of providing any expensive tools, jigs, extended instruction or other requirements that are taken into consideration on full size devices for commercial and useful purposes.

Then, too, in knockdown toy structures, in order to produce the assembled device the natural interest is often negatived by the varying results that are produced by different individuals. It takes appreciable experience to produce an assembled body from the parts supplied in a kit of knock-down parts. This extensive experience can only be acquired by repeated attempts which prove costly to youngsters of an age who are interested therein. Youngsters of immature age who would normally have an interest in assembling bodies from parts supplied in a complete kit, are not usually financially self-sufficient so that even limited expenditures are of consequence to them. Moreover, such assembly even proves tedious to the experienced builder so that this too has its effect in removing the normal interest that would be displayed toward the assembled knock-down devices. These shortcomings in the miniature field have had their effect of limiting the extensiveness of the industry.

Moreover, the elimination of these discouraging factors and the provision of a scheduled routine of assembly with accurateness which eliminates a great deal of the time and higher skill requirements necessary to produce the desired result, serves to teach these youngsters to follow production methods that may prove invaluable for assisting them to indulge in methodic routine in varied phases of their activity. The importance of impressing upon youth the advantage of following methodic planning and production methods, cannot be overestimated.

With the teachings of the present invention, method assembly methods have been provided without any appreciable expense and the extent of the results is so decidedly improved as to render it possible for all youth to quickly, satisfactorily and efficiently assemble knock-down parts to conform with a high standard of perfection without detracting from the interest in creating structural bodies. With a view of eliminating appreciable time, labor and skill requirements for such operations as well as to insure absolute uniformity even with negligible skill, miniature assembling operations have been placed on a production scale insofar as providing a templet layout that is utilized in the construction to not only guide but assist as a part of the procedure and as a complement of the parts that comprise the assembled device.

One object of the present invention is to provide a novel method of assembling parts of miniature structures to procure uniformity, speed in assembling and better results.

Another object is to provide a templet for assembling parts of a miniature structure into a unit or sub-unit of a miniature structure.

Still another object is to provide a templet to serve as a complement of parts of a miniature structure into a unit or sub-unit of a miniature structure.

A further object is the provision of a combination templet, layout and instruction sheet that serves as a complement of the parts to comprise a unit or sub-unit of a building structure.

A still further object is to provide improved templet and layout elements for miniature structures that are simple, inexpensive, and highly efficient in assembling parts into a unit or sub-unit.

Still a further object is to provide a templet for miniature structures that is stamped, cut and arranged to support parts of a unit so that they may be assembled with rapidity, uniformity and without any appreciable skill.

Other objects and advantages will appear from the following description of an illustrative embodiment of the present invention.

The structure selected for illustration exemplifies a method of assembling structural devices such as airplanes and more particularly knockdown toy airplanes. The knock-down structure devices such as airplanes are furnished to the purchaser in the form of a kit comprising all of the complemental parts that are either preshaped or outlined for shaping by the purchaser, in this instance, being intended for an airplane 10 having a dihedral wing 11 attached to a fuselage 12. The fuselage 12 has a forward motor compartment 13 that is closed by an incap 14 for attachment of a propeller (not shown) to rotate adjacent thereto.

The rear end of the fuselage 12 is provided with a horizontally extending stabilizer 15 which is bi-sected by a rudder 16 projecting upwardly therefrom. As shown, the wing 11, in this instance, has angularly related wing portions 17—18 and 19—20 which are disposed at a dihedral angle on each side of the fuselage 12 for symmetrical support thereon. It should be noted that this specific fuselage, wing, stabilizer and rudder shapes are not essential to the practice of the teachings of the present invention and are merely illustrative rather than a limitation thereof.

In the formation of the fuselage 12, there is provided a series of templets 21—22, in this instance two, that are complemental to each other by virtue of any suitable connecting expedients such as tongues 23, in this instance two, stamped or otherwise shaped from the templet sheet 22 to provide a trapezoidal configuration complemental to the correspondingly shaped and spaced notches 24 provided in the adjacent edge of the templet 21. In small structural devices, the templet sections 21—22 may be formed integral with each other and in exceedingly large structural devices, they may be segregated into even more than two sections depending upon the facility for handling and the dictates of commercial practice.

The templet sections 21—22 are stamped or otherwise shaped from any suitable sheet material such as thin cardboard paper that is preferably though not essentially provided with a closed outer surface, although other materials may be provided for this purpose with equal advantage. In the production of the fuselage 12, the hollow body thereof is defined by a framework consisting of sectional body formers 25—26, in this instance two symmetrically shaped sections that are also stamped or otherwise shaped from cardboard, although balso wood, ply-wood and many other thin sheet materials would serve this intended purpose.

The symmetrical sections or body formers 25—26 are sequentially disposed along the length of the fuselage 12 and their shape varies depending upon their intended longitudinal position therealong. For instance, the tail end of the fuselage 12 requires body formers 27—28 which are preferably different in shape from the body formers 25—26 and in each fuselage 12 there will be a substantial number of correspondingly shaped complemental body formers 25—26 of different size to define the desired contour of a finished hollow body or structural device such as the fuselage 12 of an airplane 10.

These body former members 25—26 and 27—28 as well as many others that are disposed sequentially therewith to define the entire fuselage 12, will be numbered to correspond with the position they are to assume along correspondingly aligned notches 29—30, in this instance transversely spaced from each other and longitudinally along the fuselage 12 to receive the correspondingly sized extremities 31—32 of the body former members 25—26 so that the builder regardless of experience, skill or capacity will create a structure of the desired outline, shape and configuration to function most successfully in accordance with established laws of aerodynamics as well as present a uniform streamlined appearance.

Figure 13:
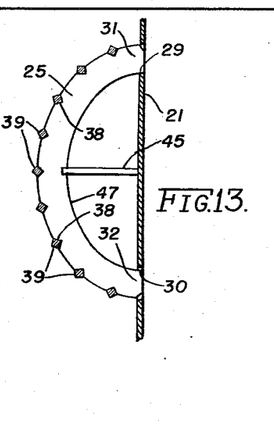
Figure 13 is a sectional view taken substantially along line XIII—XIII of Figure 11 showing former in place.
Figure 15:
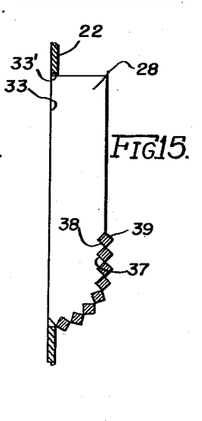
Figure 15 is a sectional view taken substantially along line XV—XV of Figure 14.
Figures 16, 17:
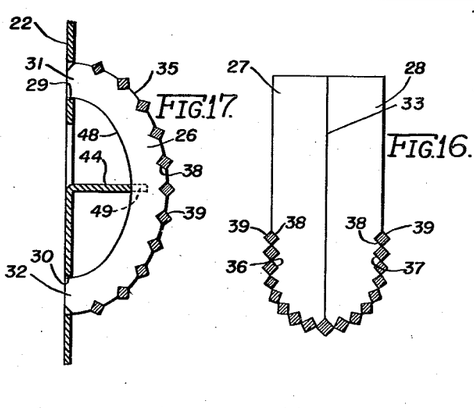
Figure 16 is a sectional view conforming to Figure 15 with the templet removed and showing two symmetrical portions adhesively connected together to comprise a cross-section of that portion of the structure taken along line XV—XV of Figure 14.
Figure 17 is a sectional view taken substantially along line XVII—XVII of Figure 14.
Figure 18:
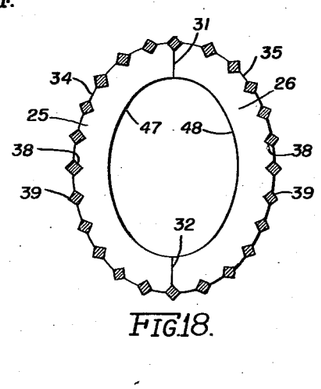
Figure 18 is a sectional view conforming to Figure 17 with the templet removed and showing two symmetrical portions adhesively connected together to comprise a cross-section of that portion of the structure taken along line XVII—XVII of Figure 14.
Figure 19:
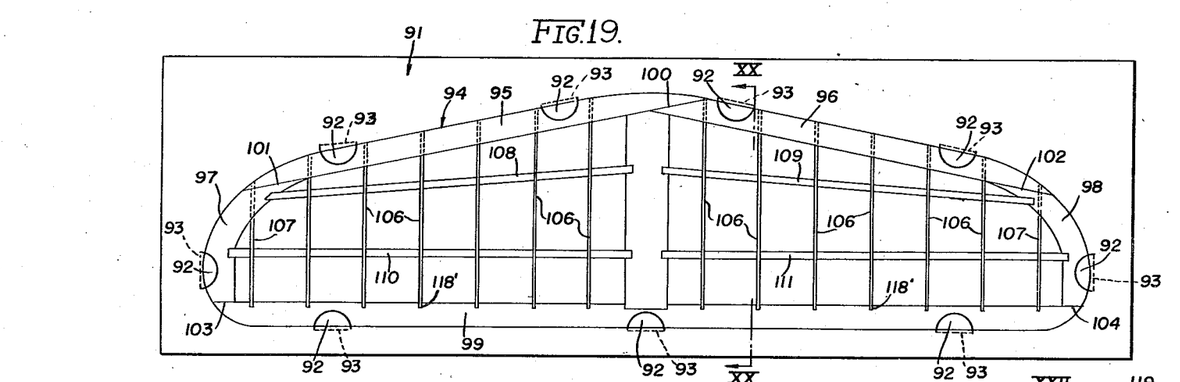
Figure 19 is a plan view of a templet for the stabilizer of a miniature structure of the type shown in Figures 1 to 3.

In the case of the tail piece of the fuselage 12, the body formers 27—28 and their longitudinal edges 33 fit into elongated slots 33', in this instance three of varying length, to receive correspondingly sized body formers 27—28 (Figures 13 and 15). In each instance, the exterior peripheral edge 34—35 of the body formers 25—26 and the lower peripheral curved edges 36—37 of the rearward body formers 27—28, are provided with a series of uniformly spaced corner notches 38 that serve to index the position of and as a seat for the rectangular longerons 39 (Figures 15 to 18) that extend longitudinally to the body formers 25—26 and 27—28 and the other body formers in sequence therewith for adhesive joinder with each to define the exterior of the hollow fuselage 12 and maintain the body formers 25—26 and 27—28 in their desired spaced relation.

Figure 11:
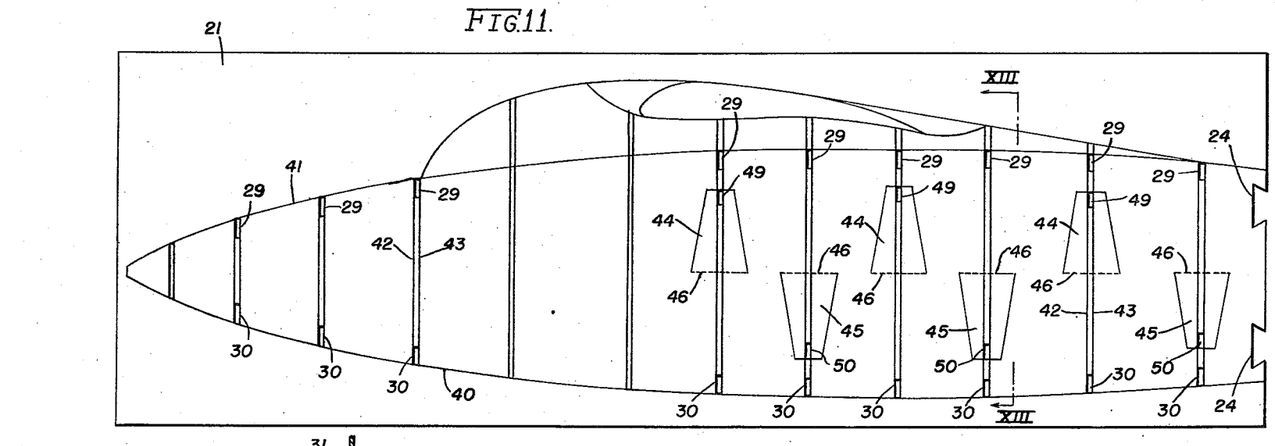
Figure 11 is a plan view of a templet for the front forward portion of the main body of the miniature structure of the type shown in Figures 1 to 3.
Figure 12:
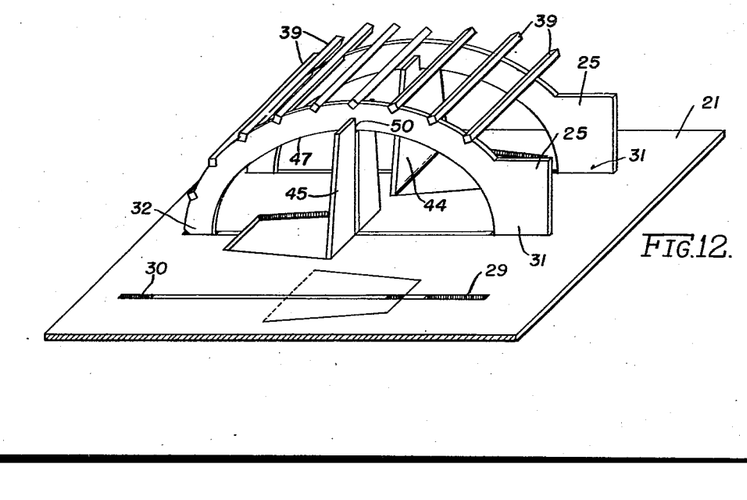
Figure 12 is a perspective view of a fragmentary front portion of the main body with its templet shown in the process of assembling.
Figure 14:
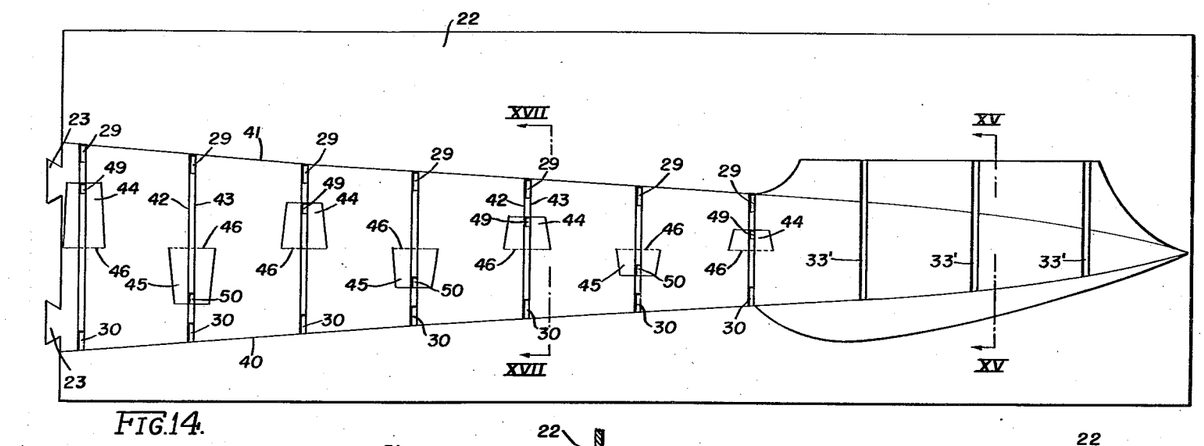
Figure 14 is a plan view of a fragmentary rear portion of the main body with its templet shown in the process of assembling.

In order to index a plurality of body formers 25, 26, 27 and 28 in their desired position for rapid placement preparatory to the attachment of the longerons 39 thereto, the templets 21—22 (Figures 11 and 14) are inscribed with an outline 40—41 showing the shade of the body to be produced therewith. Closely spaced transverse lines 42—43 are aligned with the slots 29—30 to extend therebetween in order to illustrate the cross-section or more particularly the positions of the body formers 25—26 and 27—28. Consequently, corresponding halves of the body formers 25—27 or 26—28 are provided for lodgment of their ends 31—32 in correspondingly spaced notches 29—30, while the meeting edges 33 of the body formers 27—28 are frictionally telescoped in and held by the elongated slots 33'.

It should be observed that the corresponding numbers are applied to each of the body formers 25—26 and 27—28 and that the inscribed outline 41 of the body to be formed will determine the particular body form to be telescoped for registry in the slots 29—30 and elongated slots 33'. These body formers 25—26 and 27—28 are held in their desired position with the connected templets 21—22 placed on a flat surface such as a table to present the body former halves 25, 26, 27 and 28 in vertical upright position relative to the flat surface of the templets 21—22.

In order to maintain the body former halves 25, 26, 27, and 28 in true vertical relation with respect to the templets 21—22 and parallel to each other, the body former halves 25 and 26 are engaged by alternately spaced flaps 44—45 stamped or otherwise shaped from the material of the templets 21—22 to provide a scored edge 46 (shown in dotted outline) serving as a hinge therefor. In the present embodiment, the scored lines 46 are along a longitudinal median line of the fuselage outline 41 and the flaps 44—45 are stamped or otherwise cut from the templets 21—22 in alignment with the notches 29—30. The flaps 44—45 are of sufficient length in each aligned position with the slots 29—30 to frictionally engage the confronting interior edges 47 and 48 of the body former halves 25—26.

To this end the flaps 44—45 are provided with engaging edge notches 49 and 50, respectively, along a median line thereof to frictionally receive the body former halves 25—26 therebetween in order to effectively retain the body halves 25—26 in an accurate vertical position and in true parallelism with each other without any appreciable care exercised by the builder or attendant. With this expedient, the body formers 25—26 will necessarily be held upright in that the flap notches 49—50 are in alignment with the end receiving notches 29—30 provided in the templets 21—22.

This will accurately space and support the body former halves 25—27 and 26—28 in corresponding sides of the templets 21—22 which may be rendered reversible for that purpose or a separate templet provided for the half of the body structure to be assembled therewith. With the body former halves 25—27 and 26—28 in their pre-arranged position on the templets 21—22, the longerons 39 are readily applied in aligned parallel notches 38—39 of the body formers 25—26 and 27—28, respectively. Thereupon, a quick drying adhesive is applied between the body formers 25—26 and 27—28 of the longerons 39 to effect a joinder therebetween.

After the adhesive has dried, this will render each half of the fuselage 12 a self-sustaining and form-retaining element complemental to each other for adhesive attachment to each other in order to form and define the complete fuselage 12. After the templets 21—22 have been withdrawn from the meeting edges 31—32 and 33 of the body formers 25, 26, 27 and 28 to present exposed edges to which a quick drying adhesive can be applied, attachment is effected between the fuselage halves to effect their inter-engagement. The skin or cover of the fuselage such as transparent paper or suitably colored or ornamented translucent paper is adhesively applied to the longerons 39 to provide a complete hollow body member. The appendages such as the wing 14, stabilizer 15, and rudder 16 are anchored to the fuselage 12 prior to applying the skin or cover to each element by means of rubber bands 59'.

In building the dihedral wing 14, corresponding templet sections 51, 52 and 53 are provided for each half thereof. These are suitably identified preferably by letters D, B, A, C, E, and a schematic diagram 54 and their true relationship with each other is inscribed on each of the templet sections 51, 52 and 53 so that the builder can determine and ascertain from each the exact corelation of the sections 51, 52 and 53 with each other in the construction and assembly of the complex wing 14. To this end, the templets D—E and B—C are printed on both sides and the former sustaining flaps are hinged to extend through one or the other of these sides in order to render them interchangeable for these respective positions shown on the schematic diagrams 54. Consequently, the entire wing 11 can be constructed with the use of three wing templet sections D, B and A in that the obverse side of D is imprinted for the E wing section and the obverse side of B is printed for the C wing section.

The wing section D (Figure 4) is imprinted with a straight leading edge band 55 that terminates in an edge 56 cut on the bias for contact with a corresponding edge 57 comprising a part of an integral wing tip 58 having a biased contacting edge 59 for engagement with the trailing edge of the wing 11. The trailing edge of the wing 11 is fitted into a curved cut-out 60. The trailing edge cut-out 60 terminates in a rectangular slot 61 serving as a complement to the trailing edge forming member which is fitted for retention therein.

Figure 4:
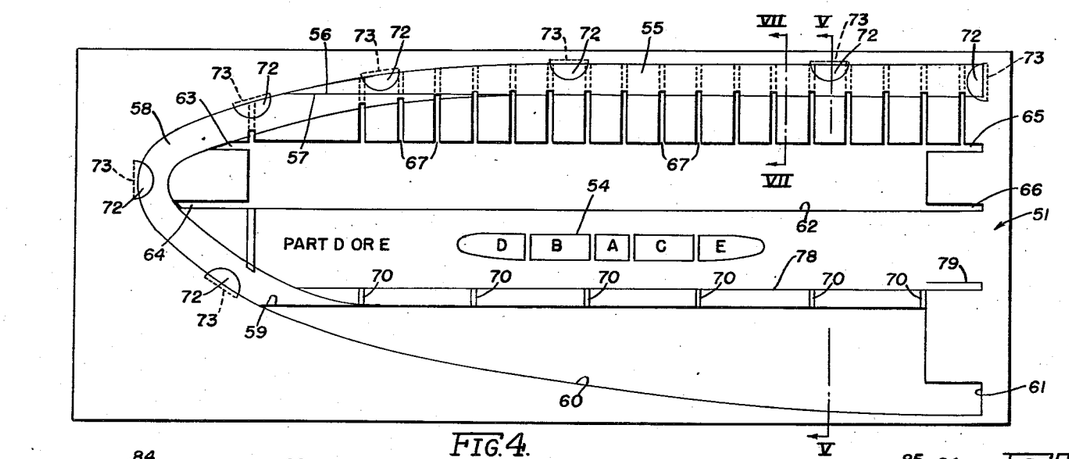
Figure 4 is a plan view of a templet for part of a wing for the miniature structures shown in Figures 1 to 3 inclusive.
Figures 5, 6, 7:
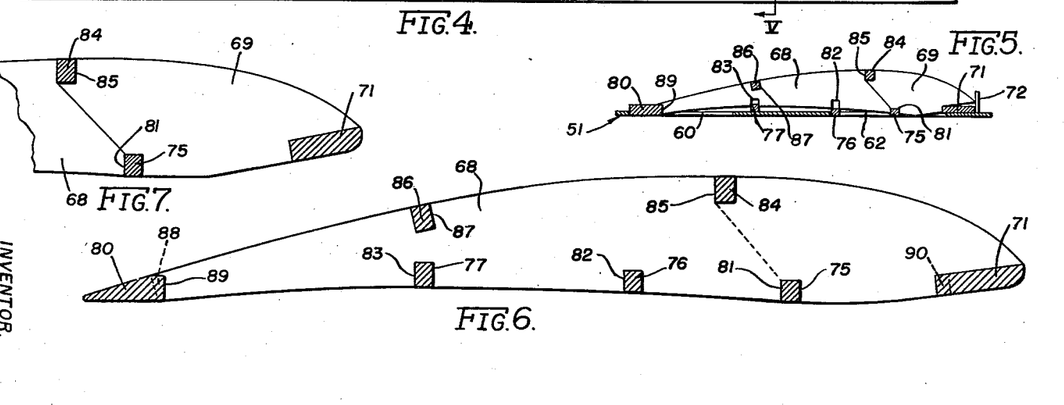
Figure 5 is a reduced sectional view taken substantially along line V—V of Figure 4.
Figure 6 is an enlarged sectional view corresponding to the wing structure of Figure 5 showing the parts of a wing cross-section.
Figure 7 is a fragmentary sectional view taken substantially along line VII—VII of Figure 4.
Figure 8:
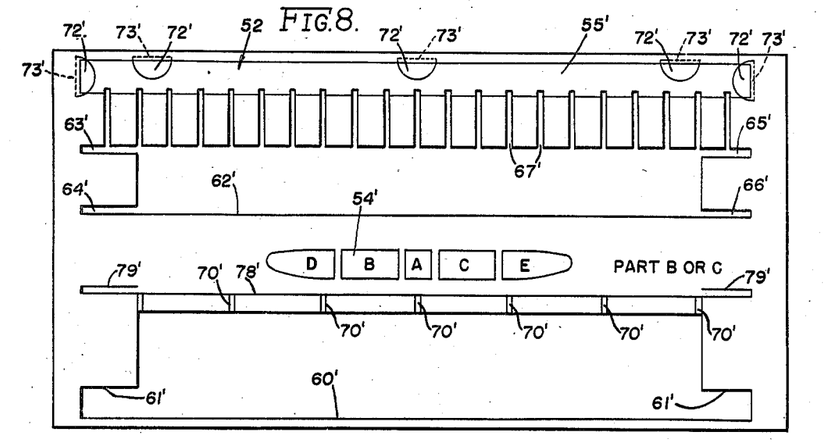
Figure 8 is a plan view of a templet of another portion of the wing structure of the miniature devices shown in Figures 1 to 3 inclusive.

The wing section 51 is also provided with a substantially rectangular cut-out 62 in parallel spaced relation with the leading edge 55 to provide longitudinal tip end slits 63 and 64 and interior end slits 65—66 communicating with the rectangular cut-out 62. A series of closely spaced and transversely parallel slits 67 are provided immediately ahead of the rectangular cut-out 62 to extend into the leading edge band 55 and communicate with the cut-out 62 for the reception of the leading extremity of the wing tip formers 68 and 69, respectively, therein.

The wing formers 68 (Figure 9) are spaced to receive two tip formers 69 therebetween so that a correspondingly spaced wing former edge aligning lines 70 are inscribed adjacent the cut-out 60 for alignment with the wing former slots 67. Certain of the slots 67 are provided for tip formers 69, but these lie intermediate the inscribed guide lines 70 near the trailing cut-outs 60 to denote the aligned slots 67 wherein the wing formers 68 are to be lodged. All other slots 67 will be lodged with tip formers 69.

Figure 1:
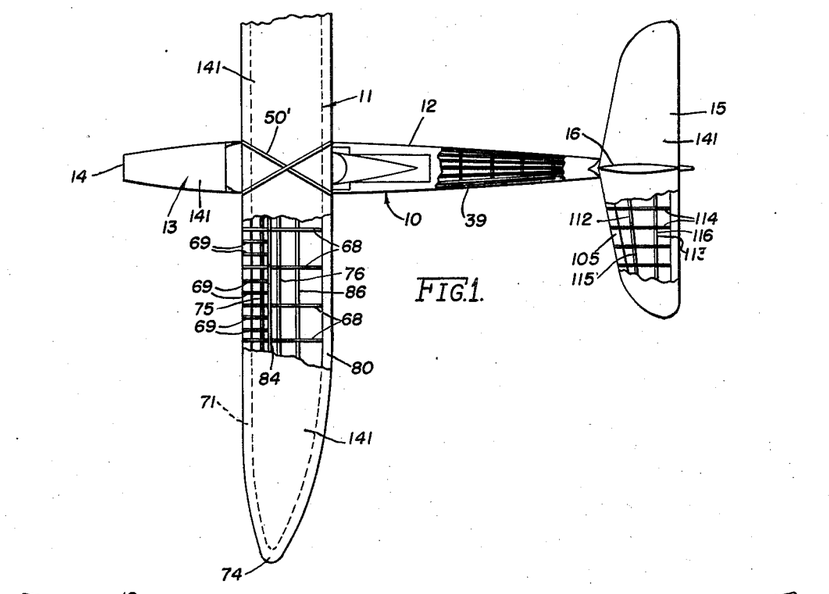
Figure 1 is a fragmentary plan view of a toy airplane that constitutes one form of a miniature structure to which the teachings of the present invention can be adapted to great advantage.
Figure 2:
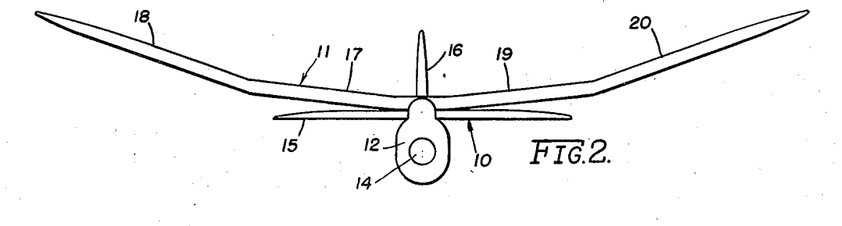
Figure 2 is a front view in elevation of the miniature structure shown in Figure 1.
Figure 3:
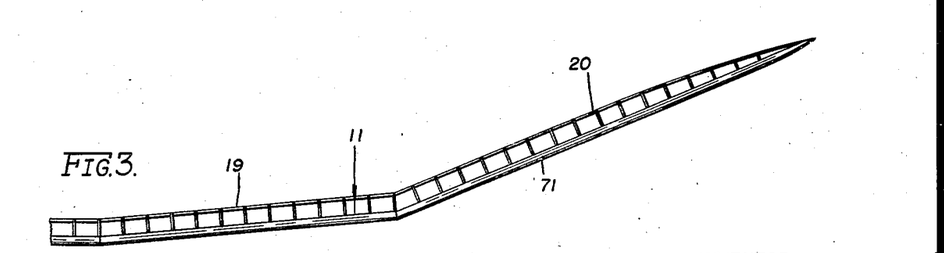
Figure 3 is a fragmentary front elevational view of a wing structure showing the interior construction thereof prior to the application of a skin or covering thereto.

In order to index the position of the leading edge 71 (Figure 9) of the wing 11 on the templets 51, a plurality of arcuately shaped flaps 72, in this instance seven, are stamped on the material of the templet 51 for scored line attachment thereto along the straight edge 73 thereof so that they can be displaced to assume a vertical position normal to the horizontal templet sheet 51, thereby serving as end and side guides for the leading edge 71 and tip 74 (Figure 1). Longitudinal wing ribs 75 and 76 extend along the wing tip D for lodgement in the aligned slits 63—65 and 64—66.

Figure 9:
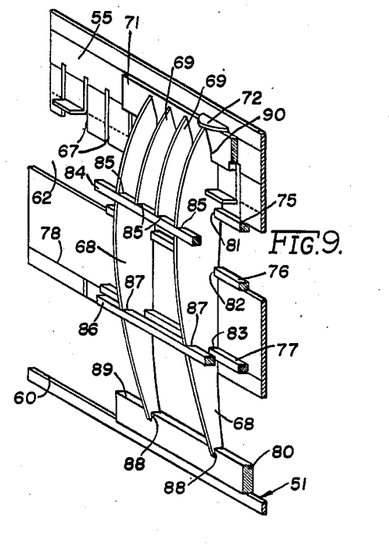
Figure 9 is a perspective view of an unfinished wing sub-assembly in conjunction with a templet, parts thereof being broken away and shown in section to clarify the showing.
Figure 10:
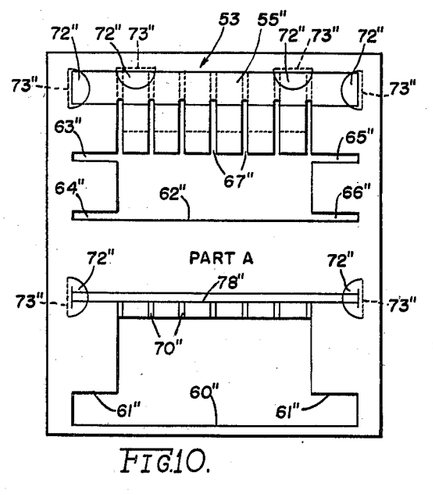
Figure 10 is a plan view of a templet of another portion of the wing structure for the miniature structure of the type shown in Figures 1 to 3.

A superimposed rib 77 is disposed longitudinally above the templet 51 for support thereon along a longitudinal line 78 which terminates at one end in a double line 79 representing the extreme indexing position for the extremity of the rib 77 (Figures 4 and 9). A trailing edge former 80 is disposed along the curved cut-out 60 for lodgment of its extremity in the rectangular slot 61. Thereupon, wing formers 48 and interposed tip formers 69 are lodged in their respective slots 67 so that the rectangular notches 81, 82 and 83 of the wing former 68 will register with the ribs 75, 76 and 77, respectively.

The top former supporting rib 84 rests in rectangular notches 85 provided in the top curved edges of the wing and tip formers 68 and 69 while another rib 86 rests in rectangular notches 87 provided in the curved edge of the wing formers 68 above the rib 77 so that these may be superimposed for notched engagement with the opposed edges of the wing former 68 with their trailing extremities lodged in notches 88 provided in the side edge 89 of the trailing edge former 80.

The leading wing edge 71 is also provided with notches 90 to receive the tips of the wing and tip formers 68—69 so that they are interengaged for joinder by means of suitable quick drying adhesive with the leading edge 71, tip 74, trailing edge 80, and longitudinal ribs or stringers 75, 77, 84 and 86. When the adhesive is completely dry, the templet 51 may be withdrawn from the interengaging edges of the wing section D. The wing sections B and A are correspondingly assembled on the templets 52 and 53, respectively, and these are correspondingly imprinted and cut out to provide for the placement of corresponding wing formers 68 and tip formers 69 with their leading edge 71 and trailing edge 80 for support by longitudinal ribs or stringers 75, 76, 77, 84 and 86 that comprise the same or a similar body member described in connection with the formation of the tip section 51.

Wing sections C and E are correspondingly constructed by utilizing the obverse side of templets 51 and 52 which are utilized to construct wing sections D and B, respectively. When wing sections D, B, A, C and E have been completely assembled in the manner and according to the method herein described, the templets 51, 52 and 53 are withdrawn therefrom so that the complemental edges of each wing section D, B, A, C, and E may be connected together by resort to the adhesive utilized in their construction. This provides a complete wing which is preferably dihedral in shape to impart the required flying stability to miniature planes of this type.

It should be noted that in templets 52 and 53, the cut-out 60' is substantially rectangular compared to the curved cut-out 60 in templet 51 to correspond with the curvature in the trailing edge of the wing section A and E. This is similarly true of the cut-out 60'' in templet 53 wherein all other features such as the end slits 63'—64'—65'—66' correspond with those in the templet 51 and communicate with the correspondingly rectangular cut-out 62' having a linear series of parallel transverse slots 67' opening therein.

Indexing flaps 72' are stamped or otherwise shaped from the sheet material of the templet 52 to index the position of the leading edge band 55'. Correspondingly spaced wing former edge aligning double lines 70' are inscribed adjacent the cut-out 60' for alignment with the wing former slots 67'. While the end templet 51 has a single double line rib indexing position 79 inscribed thereon, the templet 52 has confronting double line rib indexing positions 79' proximate to both ends thereof. Similarly, instead of the rectangular cut-out 61 adjacent the single trailing edge 60 in the templet 51, the templet 52 has a rectangular cut-out 61' at both ends of the templet to communicate with the templet 61'. This provides for the substantially rectangular wing section B instead of the curved tip wing section D.

The templet 53 is shaped to correspond with the templet 52, except that the latter is much wider than the former in the present preferred embodiment; however, this would vary within a wide range depending upon the size of the complete wing and the design of the resulting structure. For that matter, it may prove advantageous in smaller miniature structural bodies to provide a unitary templet for the entire wing. This is especially true in the event wings are constructed to extend on a common plane rather than at a dihedral angle. The longitudinal ribs which brace the wing sections B, D, A, C, and E have properly biased extremities which enable the dihedral serration of the wing sections relative to each other. Then, too, patterns may be inscribed on portions of the templets to provide a guide for the angle at which the wing sections A, B, C, D and E are to be joined or adhesively connected.

Figure 20:
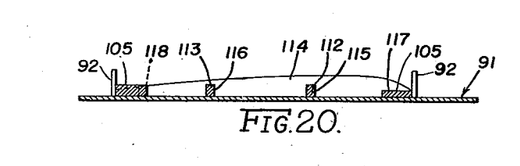
Figure 20 is a sectional view taken substantially along line XX—XX of Figure 19.

In addition to the foregoing, the stabilizer 15 is assembled according to a templet 91 which is provided with a plurality of flaps 92 stamped from the sheet material thereof to provide a score line attachment 93 serving as a hinge for the flaps 92 serving as stops when deflected to their upright or vertical position normal to the plane of the templet sheet 91 (Figure 20). The flaps 92 are spaced along the exterior edge 94 of leading, tip and trailing edge bands 95—96, 97—98 and 99 comprising the pattern for the stabilizer.

The leading edge bands 95—96 have complemental biased extremities 100 so that one may be readily adhesively joined to the other. The other extremities of the leading edge bands 95—96 are also provided with biased extremities 101 and 102 which are complements of correspondingly biased edges provided on the tips 97 and 98 to effect their adhesive joinder as a continuous band. The stabilizer tips 97—98 terminate rearwardly in straight edges 103 and 104 which are complements of the corresponding edges of the trailing edge band 99 so that the latter may be adhesively joined thereto to provide the outline of the stabilizer.

In order to assemble the stabilizer, the flaps 92 are hinged upwardly to provide stops for leading edge members that are shaped to correspond with the pattern bands 95—96. These members are comparatively flat thin sheets of balso wood or paper 105 (Figure 20) to correspond in shape to the patterns inscribed on the templet 91 so that they may be readily placed in their desired position thereon. Former patterns 106 of varying length are inscribed on the templet 91 to extend between the leading edge band 95—96 and the trailing edge 99 with the end former patterns 107 extending into the tips 97 and 98. Similarly, rib or stringer patterns 108—109 and 110—111 are inscribed to correspond with the former operators 106 for extension into the bands 97—98.

This enables actual stringers 112 and 113 to be placed over their corresponding patterns 108—109 and 110—111 for reception of normally extending stabilizer formers 114 that are notched as at 115—116 to telescopically engage the ribs or stringers 113—114 in order to enable their placement for retention in their final position prior to applying the adhesive over their interengaging surface. The leading edge of the formers 114 are cut out as at 117 to serve for an extent complemental to the leading edge members 105 while the trailing edges 99 are notched as at 118 for an extent corresponding with the interengagement shown as at 118' on the templet 91. This affords their frictional interengagement prior to the application of the adhesive. It will thus be apparent that the stabilizer 15 can be assembled with accuracy and without entailing any appreciable time or labor.

Figure 21:
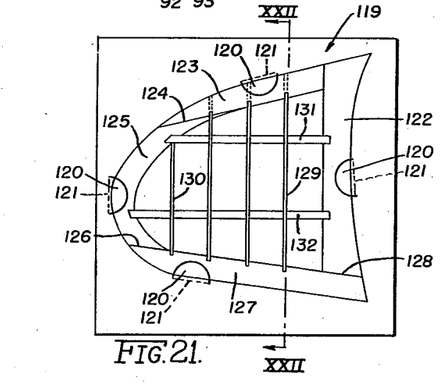
Figure 21 is a plan view of a templet for the rudder portion of a miniature structure of the type shown in Figures 1 to 3 inclusive.
Figure 22:
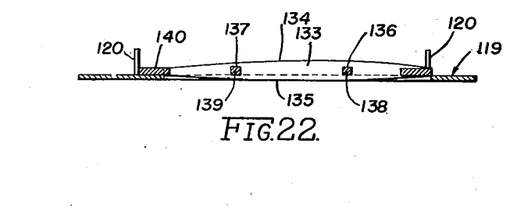
Figure 22 is a sectional view taken substantially along line XXII—XXII of Figure 21.

The rudder 16 is assembled with the aid of a templet 119 (Figure 21) which has a plurality of flaps 120 stamped from the sheet material thereof to provide a score line hinge 121 therefor. The flaps 120 can be hinged to assume an upright vertical position normal to the sheet comprising the templet 119 to provide stops for the members that are to be assembled with the aid of the pattern inscribed on the templet 119. To this end, the templet 119 has a bottom bearing member 122 inscribed therealong to serve as a complement of the leading edge 123. The leading edge 123 terminates in a biased edge 124 complemental to a corresponding bias provided on the top edge 125.

The top edge 125 terminates in a straight edge 126 that is cut on the bias to contact a corresponding edge provided on a trailing edge 127 that extends therefrom to engage the lower straight edge 128 provided on the adjacent portions of the bottom bearing member 122 and lower edge band 127. The bottom bearing member 122 and edges 123, 125, 127 define a continuous pattern outline for the rudder 16 that has a plurality of double line former patterns 129 to extend between the leading edge 123 and trailing edge 127 with the rearwardmost former 130 extending into the top edge 125.

These former patterns are interrupted by double line or stringer patterns 131 and 132 which extend between the bottom bearing member 122 and the top edge 125. Correspondingly sized formers 133 curved at confronting edges 134 and 135 are, in this instance, provided with rectangular apertures 136 and 137 which frictionally receive correspondingly shaped ribs or stringers 138 and 139, respectively. The ribs 138 and 139 are telescoped therethrough so that the former 133 will be spaced to correspond with the pattern 129—130.

The edge members 140 are sized and shaped to correspond with their pattern bottom bearing member 122 and edges 123, 125 and 127, and these are properly notched as complements of the formers 133 so they will be capable of assembly therewith precisely as inscribed by the pattern indicia on the templet 119 for superimposed placement and assembly with the aid of the pattern indicia and the flaps 120 provided on the pattern templet 119. It will be apparent, therefore, that the rudder 16 will be capable of comparatively easy assembly with the aid of the templet 119.

These parts such as the wing 11, stabilizer 15 and rudder 16 are attached to the fuselage 12 for adhesive joinder therewith. Thereupon, a skin cover composed of transparent or translucent sheet material 141 is adhesively applied to cover the fuselage 12, wing 11, stabilizer 15 and rudder 16. Various changes may be made in the embodiment herein specifically described without departing from the invention or sacrificing any of the advantages or features thereof, and nothing herein shall be construed as a limitation of the invention, its structural concept or embodiment as to the whole or any part thereof except as defined in the appended claims.

I claim:

1. A layout assembly templet for a toy airplane structure and the like comprising a flat sheet of material having prearranged means therein for receiving frame former elements therein in a substantially upright position, and other means on said flat sheet to support the frame former elements in true vertical position against accidental displacement, said last named means comprising a part of said sheet to frictionally engage frame former elements independent of said first named means.

2. A layout assembly templet for a toy airplane structure and the like comprising a flat sheet of material having prearranged means therein for receiving frame former elements therein in a substantially upright position, and hinged means stamped from the material of said flat sheet to support the frame former elements in positions spaced from said first named means in true vertical position against accidental displacement, said last named means comprising a part of said sheet to frictionally engage frame former elements independent of said first named means.

3. A layout assembly templet for a toy airplane structure and the like comprising a flat sheet of material having prearranged notches therein for receiving frame former elements therein in a substantially upright position, and other means spaced from said notches on said flat sheet to support the frame former elements in true vertical position against accidental displacement, said last named means comprising a part of said sheet to frictionally engage frame former elements independent of said first named means.

4. A layout assembly templet for a toy airplane structure and the like comprising a flat sheet of material having prearranged notches therein for receiving frame former elements therein in a substantially upright position, and hinged means independent of said notches stamped from the material of said flat sheet to support the frame former elements in true vertical position against accidental displacement.

5. A layout assembly templet for supporting a series of structural elements of a toy airplane structure or the like, each element being of the type that has spaced ends connected by an intermediate portion, said templet comprising a flat sheet of material having a series of spaced element supporting stations, each station including spaced recesses formed in the sheet, each recess adapted to receive an end of an element to locate the element on the sheet in upright position, and means secured to the sheet and engageable with the intermediate portion of the element for holding the same in upright position.

6. A templet as specified in claim 5 wherein the element engaging means comprises a portion of the sheet material bent at an angle and having spaced means for engaging opposite sides of the intermediate portion of an element.

7. A templet as specified in claim 5 wherein the element engaging means comprises a notched support secured at an angle to the sheet material, the notch adapted to engage the intermediate portion of the element.

8. A templet as specified in claim 5, wherein the structural element is of the type having an arched intermediate portion and said element engaging means comprises a tab hinged to the sheet material and being of a length to engage the underside of the arched portion of the element, said tab having means to engage sides of the arched portion to insure the upright position of a structural element.

9. A layout assembly templet for supporting a series of structural elements of a toy airplane structure or the like, each element being of the type that has spaced ends connected by an intermediate portion, said templet comprising a flat sheet of material having a series of spaced element supporting stations, each station including recess means formed in the sheet and adapted to receive each end of an element to locate the element on the sheet and support its ends against movement with respect to said sheet, and means secured to the sheet and engageable with the intermediate portion of the element for holding the same in upright position.

JOSEPH S. OTT.